(12) United States Patent
Shamasundar et al.

(10) Patent No.: US 12,461,539 B2
(45) Date of Patent: Nov. 4, 2025

(54) SYSTEM AND METHOD FOR PROVIDING ENHANCED SERVICES

(71) Applicant: HONEYWELL INTERNATIONAL INC., Charlotte, NC (US)

(72) Inventors: Raghu Shamasundar, Bangalore (IN); Subhransu Sahoo, Bangalore (IN); Richard Snyder, Phoenix, AZ (US); Kalimulla Khan, Bangalore (IN); Ramkumar Rajendran, Madurai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 420 days.

(21) Appl. No.: 17/660,889

(22) Filed: Apr. 27, 2022

(65) Prior Publication Data
US 2022/0382299 A1 Dec. 1, 2022

(30) Foreign Application Priority Data
May 27, 2021 (IN) .............................. 202111023671

(51) Int. Cl.
*G05D 1/00* (2024.01)
*G01C 21/20* (2006.01)
*G08G 5/21* (2025.01)

(52) U.S. Cl.
CPC ............. *G05D 1/106* (2019.05); *G01C 21/20* (2013.01); *G08G 5/21* (2025.01)

(58) Field of Classification Search
CPC ........ G01C 21/20; G05D 1/106; G05D 1/101; G08G 5/0013; G08G 5/0021; G08G 5/0052; G08G 5/0091; G08G 5/21; G08G 5/34; G08G 5/26; G08G 5/57; G08G 5/30; B64D 2045/0075; B64D 43/00; G09G 2380/12;
(Continued)

(56) References Cited

U.S. PATENT DOCUMENTS

| 8,392,534 B2 | 3/2013 | Causse et al. |
| 8,433,506 B2 | 4/2013 | Saggio, III et al. |
| 8,868,259 B2 | 10/2014 | Srinivasan et al. |

(Continued)

OTHER PUBLICATIONS

ITU/TSB: "Deliverable 5—Key findings, recommendations for next steps and future work (Rev.1)", ITU-T Draft; Study Period 2013-2016, International Telecommunication Union, Geneva; CH, vol. gen/16, Feb. 16, 2016 (Feb. 16, 2016), pp. 1-29, XP044166776, [retrieved on Feb. 16, 2016].

*Primary Examiner* — Hitesh Patel
(74) *Attorney, Agent, or Firm* — Ingrassia Fisher & Lorenz, LLP

(57) ABSTRACT

A system and method in an aircraft for providing enhanced services is provided. In one example, the method includes: setting up triggering logic to identify a beginning point and ending point for collecting a set of avionics system data during a flight; and systematically retrieving information for use by the triggering logic to identify the beginning point and the ending point. When the beginning point is reached, the method includes systematically repeating: retrieving the set of avionics systems data; and sending, to an off-board application, data from the set of avionics system data that has changed state from prior data sent to the off-board application. When the ending point is reached, the method includes cease sending data from the set of avionics system data to the off-board application.

20 Claims, 11 Drawing Sheets

(58) Field of Classification Search
CPC . H04L 67/12; H04B 7/18506; H04B 7/18508; H04W 4/42; H04W 84/06
See application file for complete search history.

(56) References Cited

U.S. PATENT DOCUMENTS

| | | |
|---|---|---|
| 9,346,556 B2 | 5/2016 | Ren et al. |
| 9,361,486 B2 | 6/2016 | Mcdonough et al. |
| 10,115,315 B2 | 10/2018 | Jonak et al. |
| 10,706,726 B2 | 7/2020 | Ramachandra et al. |
| 2005/0065682 A1* | 3/2005 | Kapadia ................ G07C 5/085 701/36 |
| 2018/0292231 A1* | 10/2018 | Delle-Vedove ........ B64D 45/00 |
| 2019/0108466 A1 | 4/2019 | Khan et al. |
| 2019/0149404 A1* | 5/2019 | Toews .................... G06F 9/544 709/220 |
| 2020/0168106 A1 | 5/2020 | De Prins et al. |
| 2024/0169844 A1* | 5/2024 | Subramaniyan ......... G08G 5/21 |

\* cited by examiner

SYSTEM AND METHOD FOR PROVIDING ENHANCED SERVICES

CROSS-REFERENCE TO RELATED APPLICATION

The present application claims benefit of prior filed Indian Provisional Patent Application No. 202111023671, filed May 27, 2021, and entitled "System And Method For Automatic Synchronization Between Onboard FMS And External Applications In Connected Aircraft And An Avionics Advisory System And Method" which is hereby incorporated by reference herein in its entirety.

TECHNICAL FIELD

Embodiments of the subject matter described herein relate generally to aircraft avionics. More particularly, embodiments of the subject matter relate to communication between applications resident on a device and applications resident in aircraft avionics.

BACKGROUND

Off-board applications on mobile devices, such as an electronic flight bag (EFB) or personal electronic device (PED), or in the cloud infrastructure can provide value added features that can improve the overall safety and efficiency of a flight. Off-board applications may be able provide operational insights to a flight crew or operators by taking advantage of data and/or flight plan information on-board the aircraft as well as data from external sources, such as weather.

Hence, it is desirable to provide systems and methods for providing operational insights to a flight crew or operators by taking advantage of data and/or flight plan information on-board the aircraft as well as data from external sources. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method in an aircraft is provided. The method includes: periodically receiving flight data during a flight along an active flight path from one or more avionics systems on the aircraft; periodically receiving real-time data along the active flight path at different flight levels from available service providers, the real-time data including real-time data that is available for a plurality of different service levels; periodically computing 4D trajectory variations for a plurality of flight levels based on the flight data and the real-time data; determining whether any of the computed trajectory variations would be beneficial with respect to a key performance indicator (KPI); recording a 4D trajectory variation when it is determined, based on real-time data, that the trajectory variation would be beneficial; recommending a 4D trajectory variation for use by flight crew during flight when it is determined, based on real-time data that is available for a subscribed to service level, that the trajectory variation would be beneficial; operating the aircraft in accordance with the recommended 4D trajectory variation; and providing at the conclusion of the flight a dashboard display that indicates a potential increase in benefit with respect to the KPI at the plurality of service levels.

A system for providing enhanced services during flight is provided. The system includes a controller configured to: periodically receive flight data during a flight along an active flight path from one or more avionics systems on the aircraft; periodically receive real-time data along the active flight path at different flight levels from available service providers, the real-time data including real-time data that is available for a plurality of different service levels; periodically compute 4D trajectory variations for a plurality of flight levels based on the flight data and the real-time data; determine whether any of the computed trajectory variations would be beneficial with respect to a key performance indicator (KPI); record a 4D trajectory variation when it is determined, based on real-time data, that the trajectory variation would be beneficial; recommend a 4D trajectory variation for use by flight crew during flight when it is determined, based on real-time data that is available for a subscribed to service level, that the trajectory variation would be beneficial; operate the aircraft in accordance with the recommended 4D trajectory variation; and provide at the conclusion of the flight a dashboard display that indicates a potential increase in benefit with respect to the KPI at the plurality of service levels.

A method in an aircraft for providing flight data to off-board applications is provided. The method includes: setting up triggering logic to identify a beginning point and ending point for collecting a set of avionics system data during a flight; and systematically retrieving information for use by the triggering logic to identify the beginning point and the ending point. When the beginning point is reached, the method includes systematically repeating: retrieving the set of avionics systems data; and sending, to an off-board application, data from the set of avionics system data that has changed state from prior data sent to the off-board application. When the ending point is reached, the method includes cease sending data from the set of avionics system data to the off-board application.

A system for providing flight data to off-board applications is provided. The system includes a controller configured to: set up triggering logic to identify a beginning point and ending point for collecting a set of avionics system data during a flight; and systematically retrieve information for use by the triggering logic to identify the beginning point and the ending point. When the beginning point is reached, the controller is configured to systematically repeat: retrieve the set of avionics systems data; and send, to an off-board application, data from the set of avionics system data that has changed state from prior data sent to the off-board application. When the ending point is reached, the beginning point and the ending point. When the beginning point is reached, the controller cease sending data from the set of avionics system data to the off-board application.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

Figure 1:
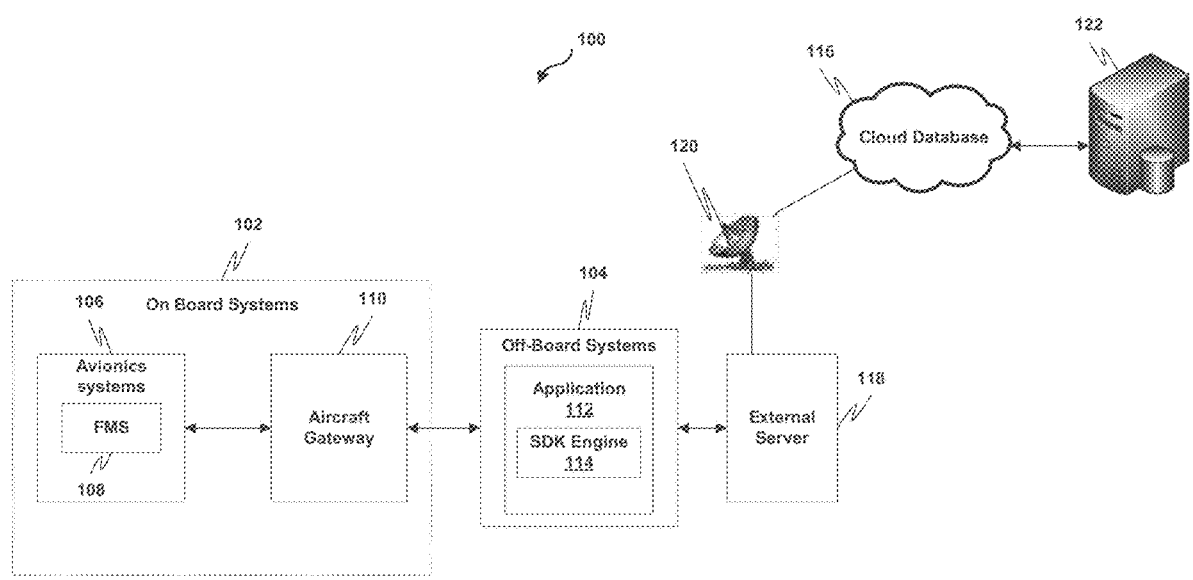
FIG. 1 is a block diagram of an example avionics environment, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to communications, signal processing, data transmission, networking, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques, and articles for increasing the capabilities of a connected flight management system (cFMS) infrastructure that provides a platform to access Enhanced Flight Management Data via a Bi-directional secured channel External applications hosted on an EFB/PED (electronic flight bag and/or personal electronic device) such as a tablet computer, laptop computer, smart phone, etc., can utilize a proposed cFMS SDK (software development kit) to build trajectory-based features that increase the overall situational awareness and improve the operational efficiency for aircraft operators. These off-board features integrate avionics data with external real-time data such as weather, traffic etc. to provide potential opportunities for a safer and optimum flight. The cFMS SDK can provide multiple different levels of services to which an operator can subscribe which provide different levels of capabilities. For example, the cFMS SDK can provide a first level of services that provides data that supports a minimum set of features (e.g., Basic Flight Planning, TOLD functions, trajectory generation), a second level of services the supports a moderate set of features (e.g., engine out diversion assistance, event monitoring and alerting), and a third level of services that supports more advanced features (e.g., energy management services, weather avoidance functions).

An operator may not know which level of services is most appropriate for use with its aircraft. The proposed cFMS SDK can monitor flights flown by an operator's aircraft and record data that will allow the cFMS SDK to compare the level of one or more KPIs (key performance indicators) obtained using a subscribed to service level with the level of KPIs that could be attained if a different service level were subscribed to. The KPIs may include one or more of the following: fuel usage, flight time, flight distance, passenger comfort, flight cost, maintenance cost, carbon emissions, and others. This can allow operators to better understand the service level that is more beneficial for the operator based on the type of flights flown by its aircraft.

FIG. 1 is a block diagram of an example avionics environment 100. The example avionics environment 100 includes on-board avionics systems 102 and off-board systems 104. The on-board systems include on-board avionics systems 106, such as an on-board flight management system (FMS) 108, that communicate via one or more internal cockpit networks and an aircraft gateway 110 that is configured to provide flight data from the on-board avionics systems 106 to one or more requesting applications 112 residing on off-board systems 104 without interrupting the operation of the on-board avionics systems 106.

The example aircraft gateway 110 is a network node that serves as an access point between the on-board avionics systems 106 and one or more requesting applications 112 (residing on one or more off-board systems 104). The aircraft gateway 110 provides a connectivity channel between the on-board avionics systems 106 and the requesting applications 112. The aircraft gateway 110 comprises one or more processors that are configured by programming instructions on non-transitory computer readable media. The aircraft gateway 110 may communicate using more than one protocol to connect to a plurality of different networks such as internal cockpit networks, other internal aircraft networks, external cloud based networks, external ground based networks, and others.

The example aircraft gateway 110 may include a node server that is configured to respond to queries from a plurality of requesting applications 112 for flight data generated from on-board avionics system functions. The flight data may include discrete data (e.g., cruise altitude, fuel on-board at destination), aggregated data (e.g., active 4D trajectory, flight summary), computational services data (e.g., 4D trajectory for a given flight plan, trip fuel/time for a flight mod request), and others. The 4D trajectory of an aircraft consists of the three spatial dimensions plus time as a fourth dimension. The node server is configured to receive, via a connectivity channel, a request from a client application 112 for flight data elements from a specified input flight plan and set of constraints; retrieve the specified input flight plan and set of constraints from the avionics functions; extract the requested data elements; and output the requested flight data elements via the connectivity channel to the client application 112. The node server can maintain communication with multiple requesting applications. Secure communication protocols may be incorporated for use with the example aircraft gateway 110 and node server.

The off-board systems 104 are processor implemented systems that are not integrated into internal cockpit networks. The off-board systems 104 may include portable devices such as an EFB (electronic flight bag), tablet computer, laptop computer, smart phone, and others, which may be transported onto the aircraft by flight crew. The off-board systems 104 may include computing systems that execute as part of a ground or cloud based computing system. The off-board systems 104 may include computing systems that execute as part of a line replaceable unit (LRU) (e.g., radar or other avionics systems) that are not integrated into internal cockpit networks. The example off-board systems 104 includes one or more applications 112 that use flight data from the on-board avionics systems 106 provided via the aircraft gateway 110 to provide enhanced services and capabilities to flight crew members, maintenance personnel, aircraft operators, and others.

The example application 112 may comprise hardware, software or both and includes a software development kit (SDK) engine 114 for requesting and receiving data for use by the application 112 to provide the enhanced services and capabilities. The example SDK engine 114 is configured to request and receive flight data from the on-board avionics systems 106 via the aircraft gateway 110. The flight data may include discrete data (e.g., cruise altitude, fuel on-board at destination), aggregated data (e.g., active 4D trajectory, flight summary), computational services data (e.g., 4D trajectory for a given flight plan, trip fuel/time for a flight mod request), and others.

The example SDK engine 114 is also configured to request and receive external real-time data such as weather, traffic etc. from external systems, such as a cloud-based database 116, for use by the application 112 to provide the enhanced services and capabilities. The example SDK engine 114 is configured to access an external server 118, that is communicatively coupled to the off-board system 104 to request and receive the external real-time data. The example external server 118 has access to the cloud-based database 116 via wireless communication equipment 120, and the cloud-based database 116 may receive the external real-time data from a data server 122.

The example SDK engine 114 is implemented using a processing component such as a controller. The processing component includes at least one processor and a computer-readable storage device or media encoded with programming instructions for configuring the processing component. The processor may be any custom-made or commercially available processor, a central processing unit (CPU), a graphics processing unit (GPU), an application specific integrated circuit (ASIC), a field programmable gate array (FPGA), an auxiliary processor among several processors associated with the processing component, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the processing component.

Figure 2:
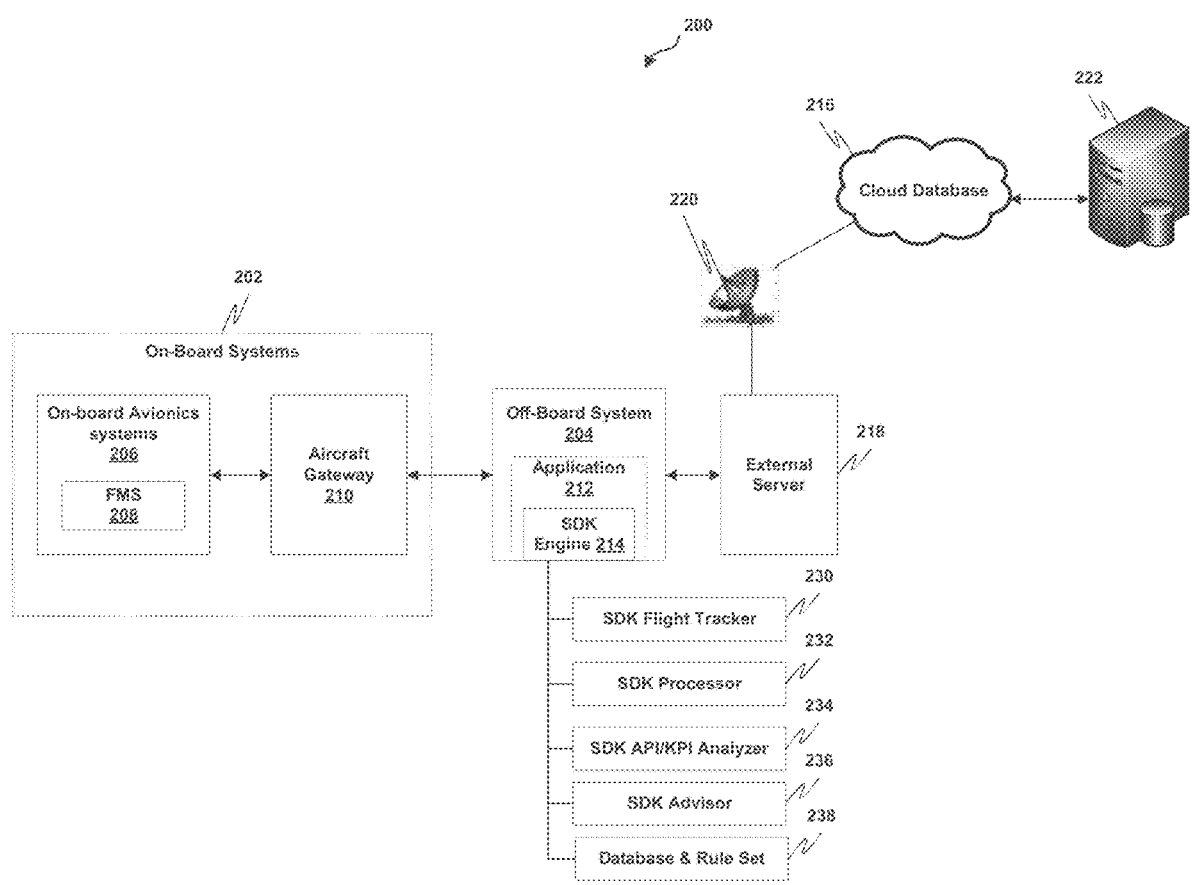
FIG. 2 is a block diagram of an example avionics environment wherein an application provides enhanced services through providing an output that advises whether improved mission performance may be achieved if additional sources of external real-time data are used or subscribed to, in accordance with some embodiments.

FIG. 2 is a block diagram of an example avionics environment 200 wherein an application provides enhanced services through providing an output that advises whether improved mission performance may be achieved if additional sources of external real-time data are used or subscribed to. The example avionics environment 200 includes on-board systems 202 and off-board systems 204. The on-board systems include on-board avionics systems 206, such as an on-board flight management system (FMS) 208, that communicate via one or more internal cockpit networks and an aircraft gateway 210 that is configured to provide flight data from on-board avionics systems 206 to one or more requesting applications 212 residing on off-board systems 204 without interrupting the operation of the on-board avionics systems 206.

The example aircraft gateway 210 is a network node that serves as an access point between the on-board avionics systems 206 and one or more requesting applications 212 (residing on one or more off-board systems 204). The aircraft gateway 210 provides a connectivity channel between the on-board avionics systems 206 and the requesting applications 212. The aircraft gateway 210 comprises one or more processors that are configured by programming instructions on non-transitory computer readable media. The aircraft gateway 210 may communicate using more than one protocol to connect to a plurality of different networks such as internal cockpit networks, other internal aircraft networks, external cloud based networks, external ground based networks, and others.

The off-board systems 204 are processor implemented systems that are not integrated into internal cockpit networks. The off-board systems 204 may include portable devices such as an EFB (electronic flight bag), tablet computer, laptop computer, smart phone, and others, which may be transported onto the aircraft by flight crew. The off-board systems 204 may include computing systems that execute as part of a ground or cloud based computing system. The off-board systems 204 may include computing systems that execute as part of a line replaceable unit (LRU) (e.g., radar or other avionics systems) that are not integrated into internal cockpit networks. The example off-board system 204 includes one or more applications 212 that use flight data from the on-board avionics systems 206 provided via the aircraft gateway 210 and external real-time data to provide enhanced services and capabilities to flight crew members, maintenance personnel, aircraft operators, and others.

The example application 212 includes a key performance indicator (KPI) SDK engine 214 for requesting and receiving data for use by the application 212 to provide the enhanced services and capabilities. The example KPI SDK engine 214 is configured to request and receive flight data from the on-board avionics systems 206 via the aircraft gateway 210 and to request and receive external real-time data such as weather, traffic etc. from external systems, such as a cloud-based database 216, for use by the application 212 to provide the enhanced services and capabilities. The example KPI SDK engine 214 is configured to access an external server 218, that is communicatively coupled to the off-board system 204 to request and receive the external real-time data. The example external server 218 has access to the cloud-based database 216 via wireless communication equipment 220, and the cloud-based database 216 may receive the external real-time data from a data server 222.

The example KPI SDK engine 214 is configured to monitor flights flown by an operator's aircraft and record data that will allow the example KPI SDK engine 214 to compare the level of KPIs obtained using a subscribed to service level with the level of KPIs that could be obtained if a different service level were subscribed to. This can allow operators to better understand the service level that is more beneficial for the operator based on the type of flights flown by its aircraft. The example SDK engine 214 includes an SDK flight tracker 230, an SDK processor 232, an SDK API/KPI (application programming interface/key performance indicator) analyzer 234, an SDK advisor 236, and a database and rule set 238. For features that have not been subscribed by the operator, the SDK flight tracker 230 retrieves relevant information from the on-board avionics 206 as well as external services that may be required for evaluation of the features. The SDK processor 232 is configured to perform processing functions for the SDK engine 214. The SDK API/KPI analyzer 234 is configured to compare the level of KPIs obtained using a subscribed to service level with the level of KPIs that could be obtained if a different service level were subscribed to. The SDK API/KPI analyzer 234 computes the relevant business logic for implementation of the feature. For features that are applicable and are resulting in potential savings, SDK API/KPI analyzer 234 records the information for further analytics. The SDK advisor 236 is configured to report results from KPI analysis and provide recommendations based on the KPI analysis to aircraft operators. The SDK advisor 236 collates all the feature level savings and provides various filtering mechanisms (by subscription service, feature, phase of flight etc.) through which the analysis of the subscription services and features can be performed. The database and rule set 238 is configured to store data and rules used when performing KPI analysis.

Figure 3:
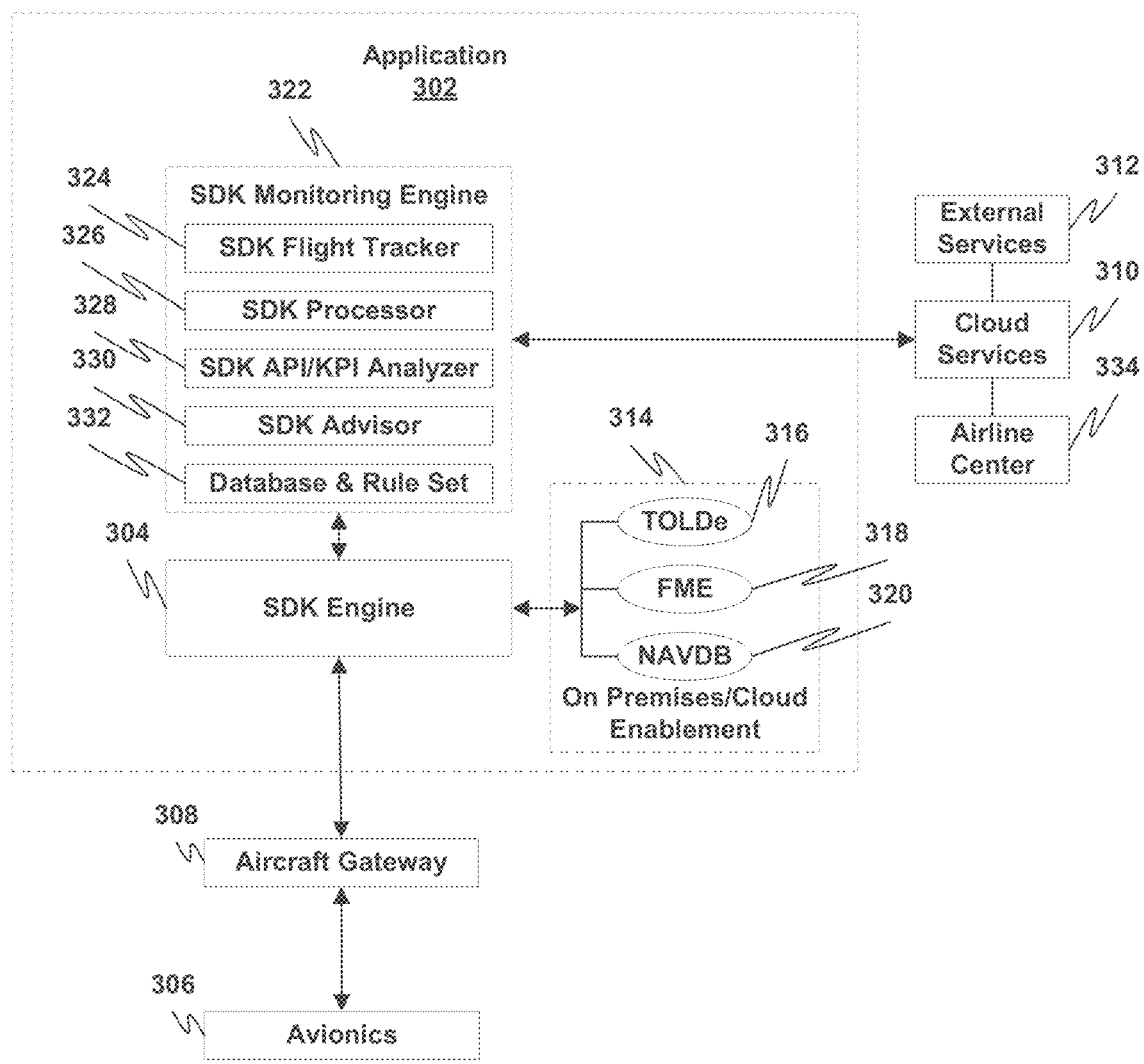
FIG. 3 is a block diagram depicting an example KPI application on an aircraft, in accordance with some embodiments.

FIG. 3 is a block diagram depicting an example KPI application 302 on an aircraft. The example KPI application 302 includes a KPI SDK engine 304 for providing enhanced services and capabilities to flight crew and/or aircraft operators. The KPI SDK engine 304 receives flight data from an avionics system 306 via an aircraft gateway 308 and may receive external real-time data such as weather, traffic etc. from cloud services 310 and/or external services 312. The KPI SDK engine 304 may also exchange data with various connected equipment 314 comprising one or more of a take-off and landing engine (TOLDe) 316, flight management equipment (FME) 318, and/or a navigation database (NAVDB) 320. The connected equipment 314 may be on-board the aircraft or accessible via the cloud.

The example KPI SDK engine 304 is implemented using a processing component such as a controller. The processing component includes at least one processor and a computer-readable storage device or media encoded with programming instructions for configuring the processing component. The example KPI SDK engine 304 is configured to periodically receive flight data during a flight along an active flight path from one or more avionics systems on the aircraft; periodically receive real-time data along the active flight path at different flight levels from available service providers, the real-time data including real-time data that is available for a plurality of different service levels; periodically compute 4D trajectory variations for a plurality of flight levels based on the flight data and the real-time data; determine whether any of the computed trajectory variations would be beneficial with respect to a key performance indicator (KPI); record a 4D trajectory variation when it is determined, based on real-time data, that the trajectory variation would be beneficial; and recommend a 4D trajectory variation for use by flight crew during flight when it is determined, based on real-time data that is available for a subscribed to service level, that the trajectory variation would be beneficial. The flight crew may operate the aircraft in accordance with the recommended 4D trajectory variation. The example KPI SDK engine 304 is further configured to provide, at the conclusion of the flight, a dashboard display that indicates a potential increase in benefit with respect to the KPI at the plurality of service levels.

The example KPI SDK engine 304 comprises an SDK monitoring engine 322 comprising an SDK flight tracker 324, an SDK processor 326, an SDK API/KPI analyzer 328, an SDK advisor 330, and a database and rule set 332. The SDK flight tracker 324 is configured to keep track of aircraft flight status from aircraft flight data received via the avionics systems 306. The SDK processor 326 is configured to perform processing functions for the SDK monitoring engine 322. The SDK API/KPI analyzer 328 is configured to compare the level of KPIs obtained using a subscribed to service level with the level of KPIs that could be obtained if a different service level were subscribed to. Reports can be generated from the SDK advisory system listing out the missed opportunities and subscriptions/features that need to be enabled to avail the same. The SDK advisor 330 is configured to report results from KPI analysis and provide recommendations based on the KPI analysis to an airline center 334. The database and rule set 332 is configured to store data and rules used for performing KPI analysis.

Figure 4:
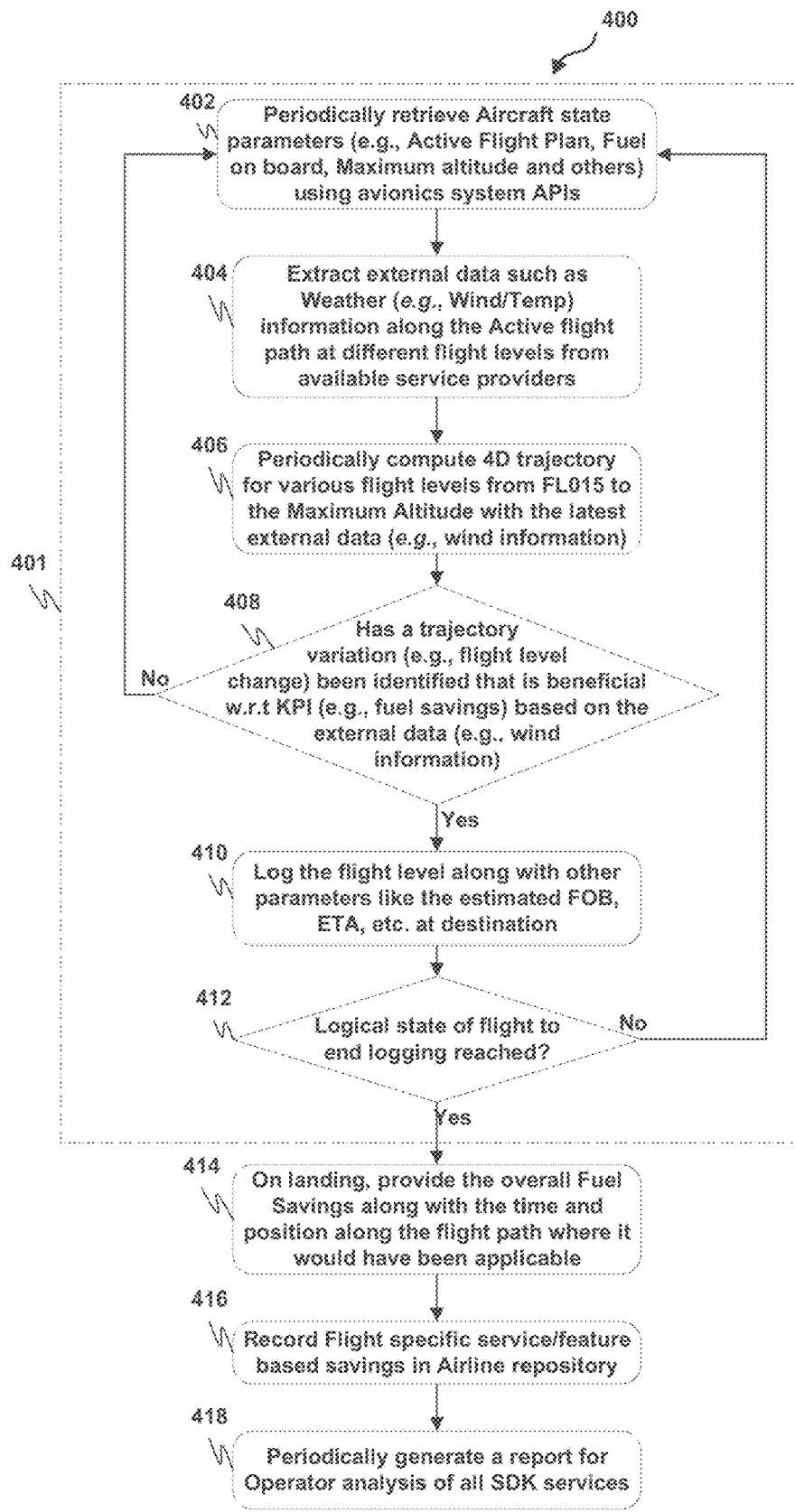
FIG. 4 is a process flow chart depicting an example process in an example KPI SDK engine in an aircraft for recording flight data, comparing the level of KPIs obtained using a subscribed to service level with the level of KPIs that could be obtained if a different service level were subscribed to, and reporting the results of the comparison, in accordance with some embodiments.

FIG. 4 is a process flow chart depicting an example process 400 in an example KPI SDK engine in an aircraft for recording flight data, comparing the level of KPIs obtained using a subscribed to service level with the level of KPIs that could be obtained if a different service level were subscribed to, and reporting the results of the comparison. The order of operation within the process 400 is not limited to the sequential execution as illustrated in the figure but may be performed in one or more varying orders as applicable and in accordance with the present disclosure.

The example process 400 includes periodically retrieving flight data from avionics systems (operation 402). The flight data may include aircraft state parameters (e.g., active flight plan, fuel on-board, maximum altitude, and others) and may be retrieved using avionics system (e.g., FMS) APIs.

Example process 400 includes extracting external data such as weather information along the active flight path at different flight levels from available service providers (operation 404). The weather information may include wind information, temperature information, or other weather information.

Example process 400 includes periodically computing 4D trajectory variations for a plurality of flight levels (operation 406). Periodically computing 4D trajectory variations may involve periodically computes 4D trajectory variations for a plurality of flight levels up to a maximum altitude and/or periodically computing 4D trajectory variations with the most recent weather information, such as wind information. The 4D trajectory variations may include altitude variations or others.

Example process 400 includes determining whether any of the computed trajectory variations would be beneficial with respect to a key performance indicator (KPI) (decision 408). The determination is made based on the external data (e.g., wind information). The KPI may be related to fuel savings, fuel usage, flight time, and others.

If a trajectory variation has not been identified that would be beneficial with respect to a KPI based on the external data (no at decision 408), then the process continues with periodically retrieving flight data from avionics systems (operation 402).

If a trajectory variation has been identified that would be beneficial with respect to a KPI based on the external data (yes at decision 408), then the process includes recording the 4D trajectory variation (operation 410). Recording the 4D trajectory variation may include logging the flight level along with other parameters such as the estimated fuel on board (FOB) at the destination, estimated time of arrival (ETA), and others.

Example process 400 includes determining if a logical state of flight to end logging operations has been reached (decision 412). If the logical state of flight to end logging operations has not been reached (no at decision 412), then the process continues with periodically retrieving flight data from avionics systems (operation 402).

If the logical state of flight to end logging operations has been reached (yes at decision 412), then the process 400 includes, providing at the conclusion of the flight a dashboard display that indicates a potential increase in benefit with respect to the KPI at the plurality of service levels (operation 414). The dashboard display may provide, for example, the overall fuel savings along with the time and position along the flight path where it would have been applicable.

Example process 400 may further include recording flight specific service/feature based savings in an airline repository (operation 416) and periodically generating a report for operator analysis of all SDK services (operation 418). The operations 401 are performed during flight and operations 414, 416, and 418 may be performed after the flight.

Figure 5:
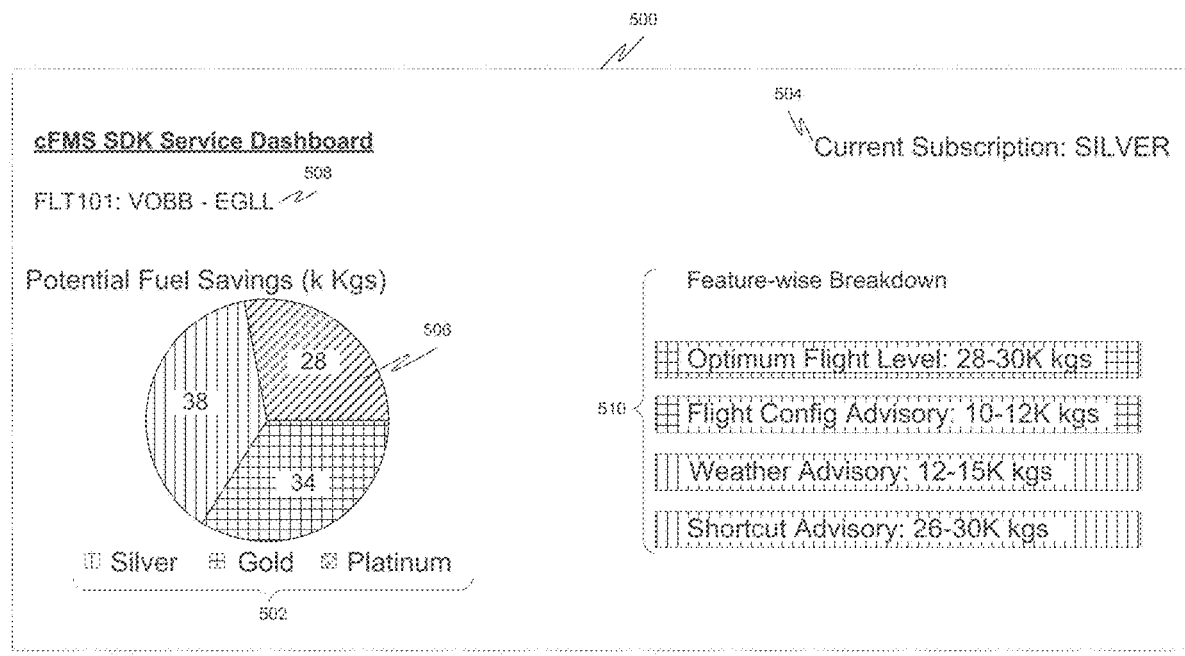
FIG. 5 is diagram depicting an example KPI SDK service dashboard GUI that an example KPI SDK engine may generate for transmission and display on a user device at an airline center, in accordance with some embodiments.

FIG. 5 is diagram depicting an example KPI SDK service dashboard graphical user interface (GUI) 500 that an example KPI SDK engine may generate for transmission and display on a user device at an airline center. In this example, the example KPI SDK engine SDK engine provides three levels of service, a silver level, a gold level, and a platinum level as indicated by available service level indicators 502. Also, in this example, the airline operator subscribes to a silver service level as indicated by the subscribed to service level indicator 504. The example SDK service dashboard GUI provides a pie chart graphical element 506 that shows potential fuel savings that may be attained using the three provided service levels: 28 k Kgs for the silver service level, 34 k Kgs for the gold service level, and 38 k Kgs for the platinum service level for a specific flight 508. The example SDK service dashboard GUI additionally provides a graphical indication 510 that provides a feature-wise breakdown of how the potential fuel savings could be obtained for the non-subscribed service levels.

Figure 6:
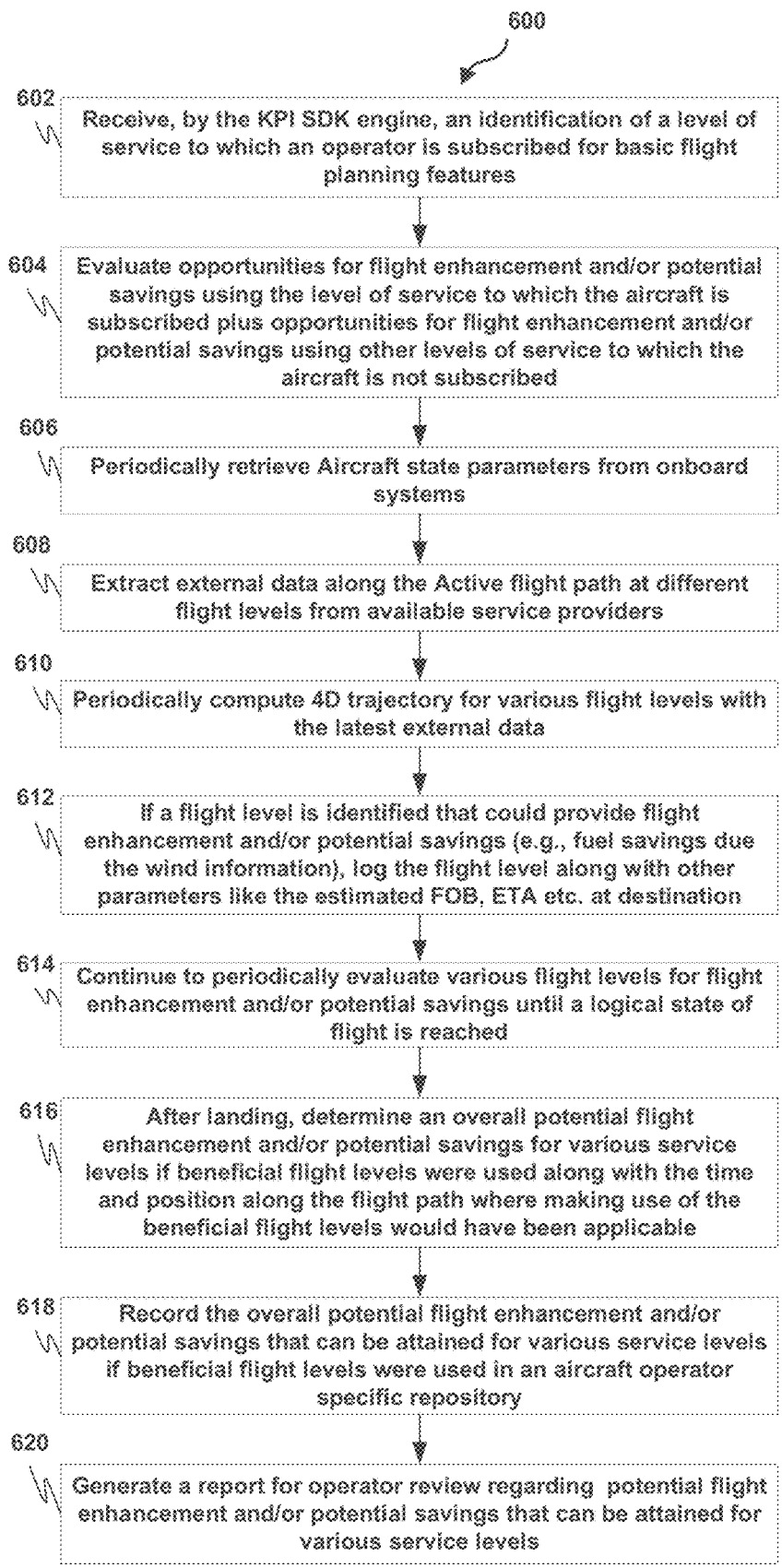
FIG. 6 is a process flow chart depicting another example process for providing enhanced services for an aircraft operator through the use of an example KPI SDK engine, in accordance with some embodiments.

FIG. 6 is a process flow chart depicting another example process 600 for providing enhanced services for an aircraft operator through the use of an example KPI SDK engine. The example process 600 includes receiving, by the KPI SDK engine, an identification of a level of service (e.g., silver) to which an operator is subscribed for basic flight planning features (operation 602).

During flight, the KPI SDK engine evaluates opportunities for flight enhancement and/or potential savings using the level of service (e.g., silver) to which the aircraft is subscribed plus opportunities for flight enhancement and/or potential savings using other levels of service (e.g., gold—a higher level or bronze a lower level) to which the aircraft is not subscribed (operation 604). During flight, the KPI SDK engine periodically retrieves Aircraft state parameters (such as the Active Flight Plan, Fuel on-board, Maximum altitude, and other Aircraft state parameters) from on-board systems (e.g., the FMS using FMS APIs) (operation 606). During flight, the KPI SDK engine also extracts external data such as Weather (Wind/Temp) information along the Active flight path at different flight levels from available service providers (operation 608). During flight, the KPI SDK engine periodically computes 4D trajectory for various flight levels (e.g., from FL015 to the Maximum Altitude) with the latest external data (e.g., wind information) (operation 610). During flight, if a flight level is identified that could provide flight enhancement and/or potential savings (e.g., fuel savings due the wind information), the KPI SDK engine logs the flight level along with other parameters like the estimated FOB, ETA etc. at destination (operation 612). During flight, the KPI SDK engine continues to periodically evaluate various flight levels for flight enhancement and/or potential savings until a logical state of flight is reached (e.g., 200 nm before top of descent) (operation 614).

After landing, the KPI SDK engine determines an overall potential flight enhancement and/or potential savings for various service levels if beneficial flight levels were used along with the time and position along the flight path where making use of the beneficial flight levels would have been applicable (operation 616). After landing, the KPI SDK engine records the overall potential flight enhancement and/or potential savings that can be attained for various service levels if beneficial flight levels were used in an aircraft operator specific repository (operation 618). Periodically, the KPI SDK engine generates a report for operator review regarding potential flight enhancement and/or potential savings that can be attained for various service levels (operation 620).

Figure 7:
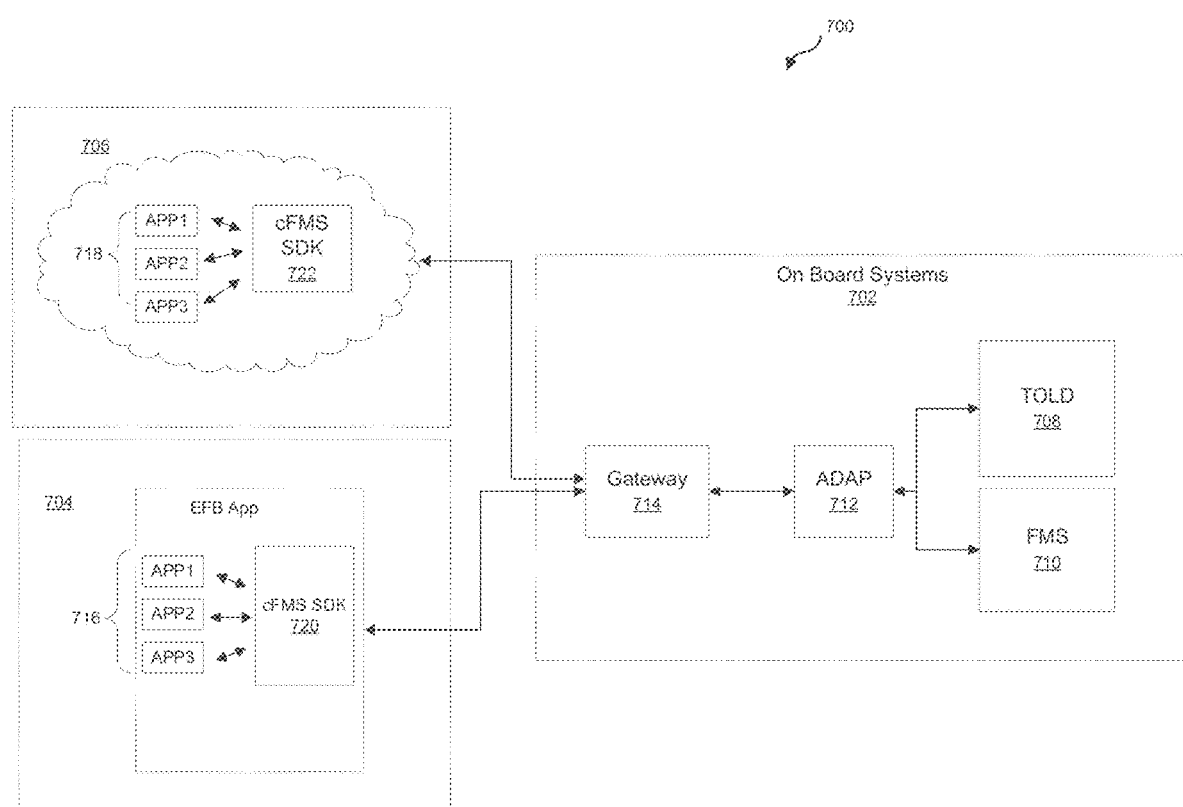
FIG. 7 is a block diagram of another example avionics environment wherein an application provides enhanced services during an aircraft flight, in accordance with some embodiments.

FIG. 7 is a block diagram of another example avionics environment 700 wherein an application provides enhanced services during an aircraft flight. The example avionics environment 700 includes on-board systems 702, on aircraft mobile (e.g., EFB or PED) applications 704, and cloud-based applications 706. The example on-board systems include one or more on-board avionics systems such as a TOLD (take-off and landing) system 708, an FMS 710, and/or others. An Aircraft Data Access Port/Partition (ADAP) 712 and a Gateway 714 are also provided to provide the mobile applications 704 and/or the cloud-based applications 706 with access to the one or more avionics systems (e.g., the TOLD system 708 and/or the FMS 710).

The apparatus, systems, techniques, and articles disclosed herein can facilitate continuously collecting the most recent data from on-board avionics systems (e.g., FMS 710) and providing the same to off-board applications 716 embedded in the mobile applications 704 or off-board applications 718 hosted on a remote server (cloud) 706 via a connected FMS (cFMS) SDK 720/722 for application developers ease of use. Applications 716/718 requiring the most recent data may register for this function, select parameters from a list of parameters that can be synchronized from a super set of avionics systems (e.g., FMS 710) data, and specify the duration of synchronization.

During flight, the cFMS SDK 720, 722 continuously monitors the avionics systems (e.g., FMS 710) for the parameters that have been registered for synchronization and based on the duration of synchronization retrieves the information from avionics systems (e.g., FMS 710) and provides it to the clients (apps 716, 718) in a prescribed form/interface (e.g., json, Object etc.). The example cFMS SDK 720, 722 has internal mechanisms (temporary storage of data, event trigger logic, data comparison for change detection etc.) to manage the synchronization across various apps (716, 718) and reduce the data retrieval from the avionics systems (e.g., FMS 710). The connectivity between the cFMS SDK (720, 722) and the avionics systems (e.g., FMS 710) is via an Aircraft Data Access Port/Partition (ADAP) 712 and Gateway Hardware 714 that connects the mobile applications 704 or Cloud based applications 706 with the on-board avionics systems (e.g., FMS 710).

Figure 8:
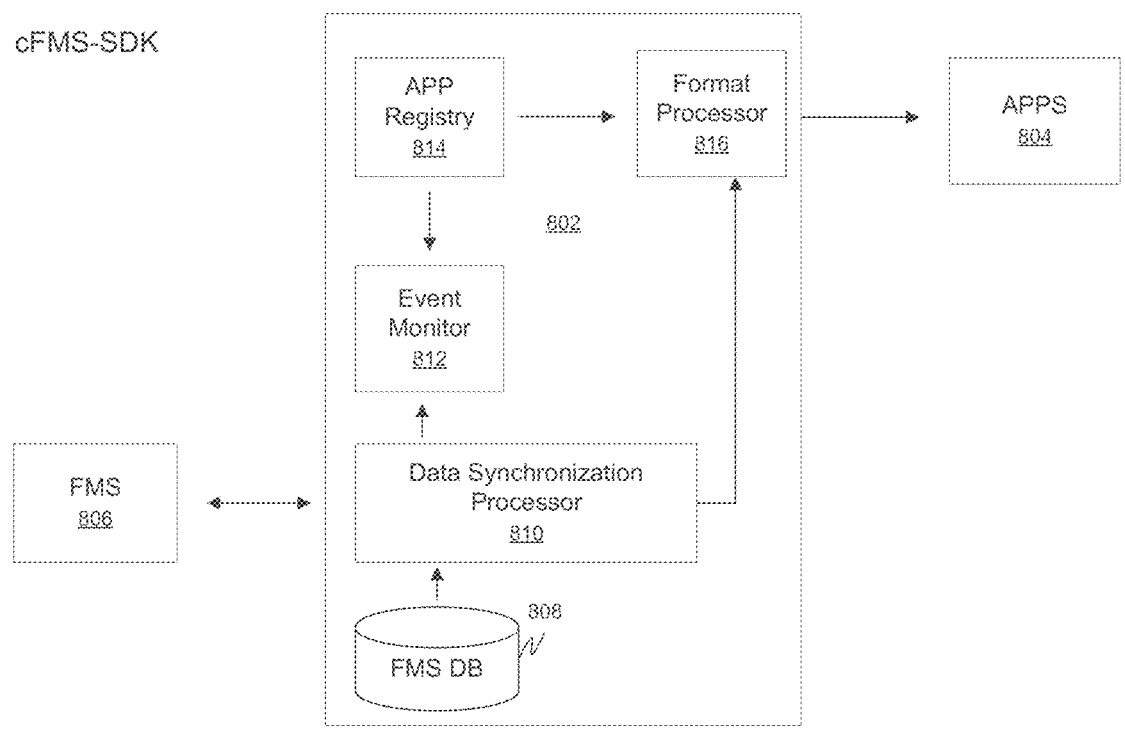
FIG. 8 is a block diagram depicting an example cFMS SDK with internal mechanisms to manage the synchronization across various apps and reduce the data retrieval from the on-board avionics systems, in accordance with some embodiments.

FIG. 8 is a block diagram depicting an example cFMS SDK 802 with internal mechanisms to manage the synchronization across various apps 804 and reduce the data retrieval from the on-board avionics systems 806. The example cFMS SDK 802 is implemented using a processing component such as a controller. The processing component includes at least one processor and a computer-readable storage device or media encoded with programming instructions for configuring the processing component. The example cFMS SDK 802 is configured to set up triggering logic to identify a beginning point and ending point for collecting a set of avionics system data during a flight; systematically retrieve information for use by the triggering logic to identify the beginning point and the ending point; when the beginning point is reached, systematically repeat retrieving the set of avionics systems data and sending, to an off-board application, data from the set of avionics system data that has changed state from prior data sent to the off-board application; and when the ending point is reached, cease sending data from the set of avionics system data to the off-board application.

The example cFMS SDK 802 includes an FMS database 808, a data synchronization processor 810, an event monitor 812, an application registry 814, and a format processor 816. The FMS database 808 is configured for the temporary storage of data. The data synchronization processor 810 and event monitor 812 are configured to implement the trigger logic to identify a beginning point and ending point for collecting a set of avionics system data during a flight, determine which of the set of avionics system data was not previously sent to the off-board application or changed state since previously being sent to the off-board application, and send to the off-board application data from the set of avionics system data that was not previously sent to the off-board application or changed state since previously being sent to the off-board application. The application registry 814 is configured for use by an application 804 to register for service, select parameters from a list of parameters that can be synchronized from a super set of avionics systems data (e.g., data from FMS 806), and specify the duration of synchronization. The format processor 816 is configured for providing data to the applications 804 in a format that the applications can understand.

Figure 9:
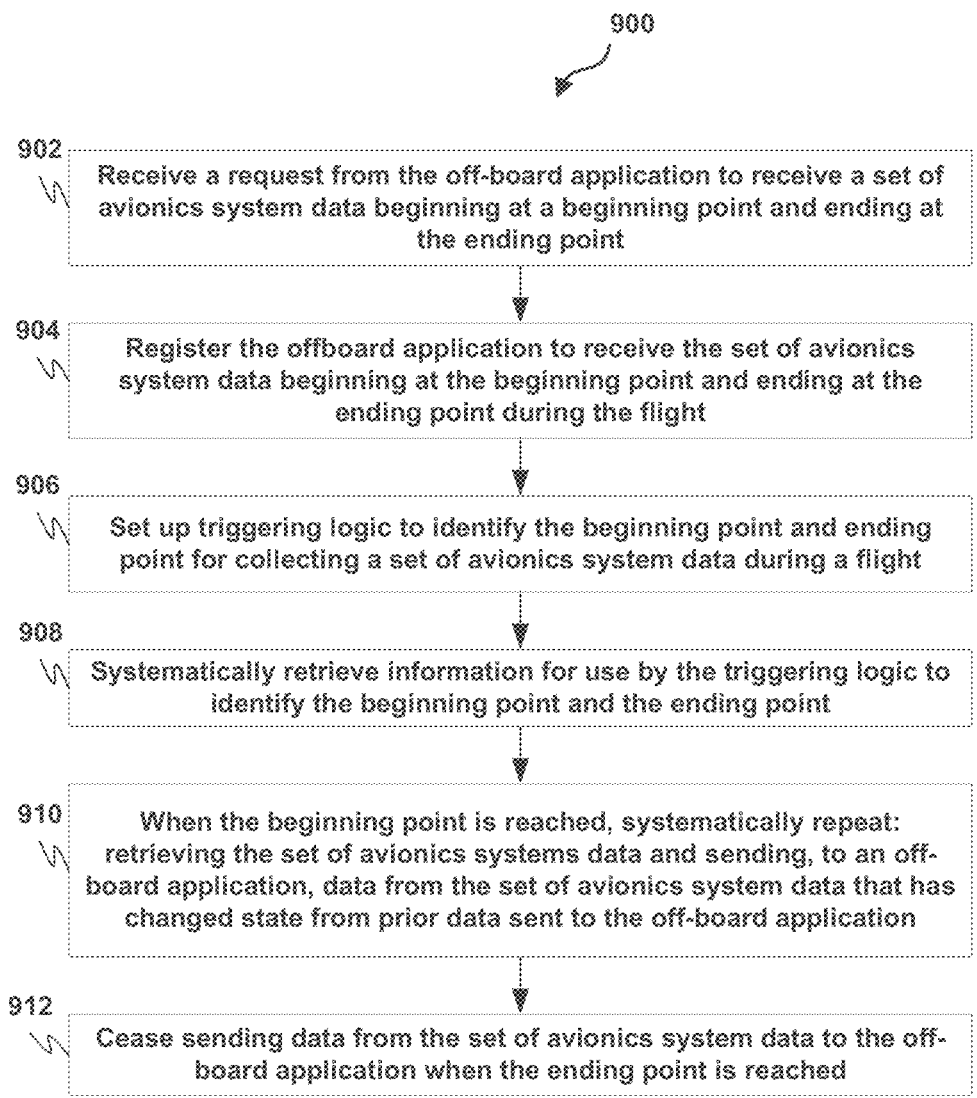
FIG. 9 is a process flow chart depicting an example process in an aircraft for continuously collecting recent data from avionics systems and providing the data to off-board applications, in accordance with some embodiments.

FIG. 9 is a process flow chart depicting an example process 900 in an aircraft for continuously collecting recent data from avionics systems and providing the data to off-board applications. The order of operation within the process 900 is not limited to the sequential execution as illustrated in the figure but may be performed in one or more varying orders as applicable and in accordance with the present disclosure.

The example process 900 may include receiving a request from the off-board application to receive a set of avionics system data beginning at a beginning point and ending at the ending point (operation 902) and registering the off-board application to receive the set of avionics system data beginning at the beginning point and ending at the ending point during the flight (operation 904). The data from the set of avionics systems data may include flight data computed from the avionics system data. Receiving the request may include receiving a request from the off-board application to receive the flight data beginning at the beginning point and ending at the ending point and registering the off-board application to receive the flight data beginning at the beginning point and ending at the ending point during the flight.

The example process 900 includes setting up triggering logic to identify the beginning point and ending point for collecting a set of avionics system data during a flight (operation 906).

The example process 900 includes systematically retrieving information for use by the triggering logic to identify the beginning point and the ending point (operation 908). Systematically retrieving information for use by the triggering logic to identify the beginning point and the ending point may include: systematically retrieving information for use by the triggering logic from aircraft systems, applying the retrieved information to the triggering logic, and determining from applying the retrieved information to the triggering logic when the beginning point is reached.

The example process 900 includes, when the beginning point is reached, systematically repeating: retrieving the set of avionics systems data and sending, to an off-board application, data from the set of avionics system data that has changed state from prior data sent to the off-board application (operation 910). Sending data from the set of avionics system data that has changed state from prior data sent to the off-board application may include: determining which of the set of avionics system data was not previously sent to the off-board application or changed state since previously being sent to the off-board application and sending to the off-board application data from the set of avionics system data that was not previously sent to the off-board application or changed state since previously being sent to the off-board application.

The data from the set of avionics systems data may include flight data computed from the avionics system data. In this case, the sending data from the set of avionics system data that has changed state from prior data sent to the off-board application may include: computing the flight data from the avionics systems data; and sending the computed flight data to the off-board application. The sending the computed flight data to the off-board application may include: determining which of the flight data was not previously sent to the off-board application or changed state since previously being sent to the off-board application and sending to the flight data that was not previously sent to the off-board application or changed state since previously being sent to the off-board application.

The example process 900 includes, when the ending point is reached, cease sending data from the set of avionics system data to the off-board application (operation 912).

Figure 10:
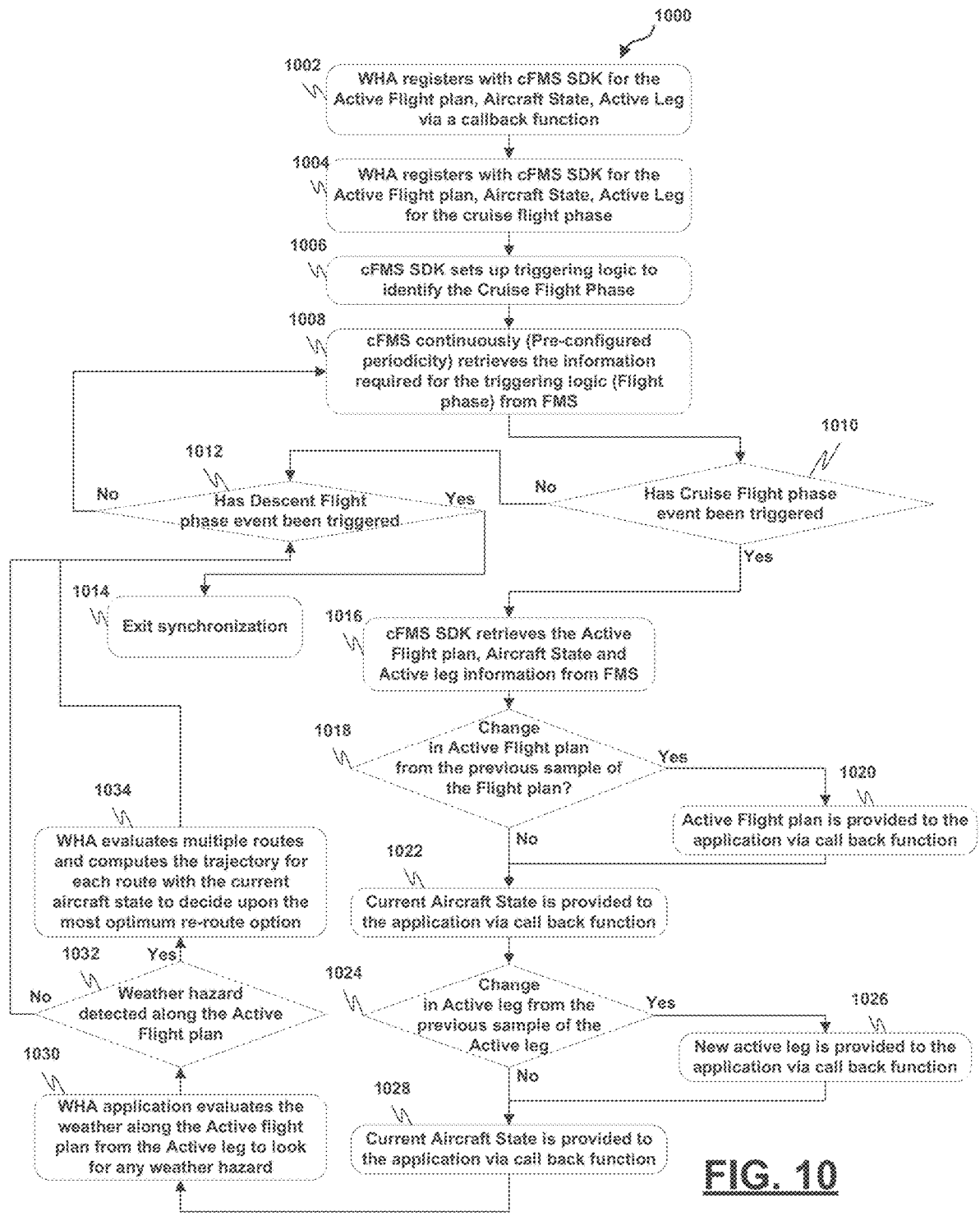
FIG. 10 is a process flow chart depicting an example process in an aircraft for continuously collecting recent data from avionics systems and providing the data to off-board applications, in accordance with some embodiments.

FIG. 10 is a process flow chart depicting an example process 1000 in an aircraft for continuously collecting recent data from avionics systems and providing the data to off-board applications. The order of operation within the process 1000 is not limited to the sequential execution as illustrated in the figure but may be performed in one or more varying orders as applicable and in accordance with the present disclosure.

The example process 1000 includes a Weather Hazard Avoidance (WHA) application registering with a cFMS SDK (operation 1002). The WHA application may register for the active flight plan, aircraft state, active leg and may register via a callback function.

Example process 1000 includes the WHA application registering with cFMS SDK for the Active Flight plan, Aircraft State, Active Leg for the cruise flight phase (operation 1004).

Example process 1000 includes cFMS SDK setting up triggering logic to identify the Cruise Flight Phase (operation 1006).

Example process 1000 includes cFMS continuously (pre-configured periodicity) retrieving the information required for the triggering logic (Flight phase) from FMS (operation 1008).

Example process 1000 includes determining if the Cruise Flight phase event has been triggered (decision 1010).

Example process 1000 includes determining if the Descent Flight phase event has been triggered (decision 1012).

Example process 1000 includes exiting synchronization (operation 1014) if the Descent Flight phase event has been triggered.

Example process 1000 includes cFMS SDK retrieving the Active Flight plan, Aircraft State and Active leg information from FMS (operation 1016) if the Cruise Flight phase event has been triggered.

Example process 1000 includes determining if change in Active Flight plan from the previous sample of the Flight plan is detected (decision 1018).

Example process 1000 includes Active Flight plan is provided to the application via call back function (operation 1020) if change in Active Flight plan from the previous sample of the Flight plan is detected.

Example process 1000 includes Current Aircraft State is provided to the application via call back function (operation 1022).

Example process 1000 includes determining if a change in Active leg from the previous sample of the Active leg is detected (decision 1024).

Example process 1000 includes providing new active leg to the application via call back function (operation 1026) if a change in Active leg from the previous sample of the Active leg is detected.

Example process 1000 includes providing Current Aircraft State to the application via call back function (decision 1028).

Example process 1000 includes WHA application evaluating the weather along the Active flight plan from the Active leg to look for any weather hazard (operation 1030).

Example process 1000 includes determining if weather hazard has been detected along the Active Flight plan (decision 1032).

Example process 1000 includes WHA evaluating multiple routes and computing the trajectory for each route with the current aircraft state to decide upon the most optimum re-route option (operation 1034) if weather hazard has been detected along the Active Flight plan.

Figure 11:
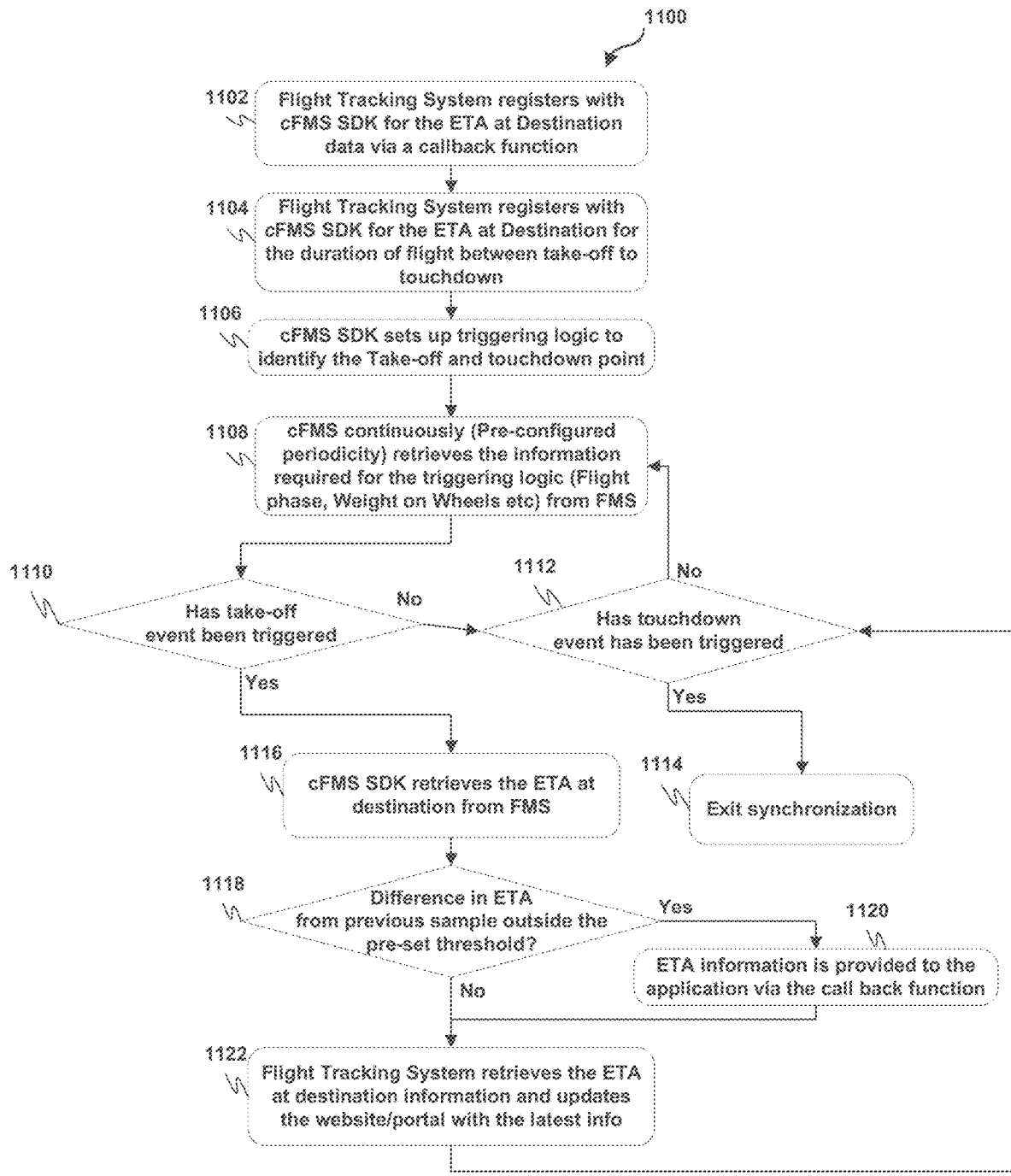
FIG. 11 is a process flow chart depicting an example process in an aircraft for continuously collecting recent data from avionics systems and providing the data to off-board applications.

FIG. 11 is a process flow chart depicting an example process 1100 in an aircraft for continuously collecting recent data from avionics systems and providing the data to off-board applications. The order of operation within the process 1100 is not limited to the sequential execution as illustrated in the figure but may be performed in one or more varying orders as applicable and in accordance with the present disclosure.

The example process 1100 includes Flight Tracking System registering with cFMS SDK for the ETA at Destination data via a callback function (operation 1102).

The example process 1100 includes Flight Tracking System registering with cFMS SDK for the ETA at Destination for the duration of flight between take-off to touchdown (operation 1104).

The example process 1100 includes cFMS SDK setting up triggering logic to identify the Take-off and touchdown point (operation 1106).

The example process 1100 includes cFMS continuously (pre-configured periodicity) retrieving the information required for the triggering logic (Flight phase, Weight on Wheels etc.) from FMS (operation 1108).

The example process 1100 includes determining if take-off event has been triggered (decision 1110).

The example process 1100 includes determining if touchdown event has been triggered (decision 1112).

The example process 1100 includes exiting synchronization (operation 1114) if touchdown event has been triggered.

The example process 1100 includes cFMS SDK retrieving the ETA at destination from FMS (operation 1116) if take-off event has been triggered.

The example process 1100 includes determining if the difference in ETA from previous sample is outside a pre-set threshold (decision 1118).

The example process 1100 includes ETA information being provided to the application via the call back function (operation 1120) if the difference in ETA from previous sample is outside a pre-set threshold.

The example process 1100 includes Flight Tracking System retrieving the ETA at destination information and updates the website/portal with the latest info (operation 1122).

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for providing enhanced services during flight, the system comprising:
    one or more on-board avionics systems in an aircraft including an on-board flight management system (FMS) that communicate via an internal cockpit network;
    an aircraft gateway that is configured to provide flight data from the one or more on-board avionics systems to an off-board applications residing on an off-board system without interrupting operation of the one or more on-board avionics systems;
    the off-board system comprising an on-aircraft mobile device, the on-aircraft mobile device comprising an electronic flight bag or a personal electronic device;
    the on-aircraft mobile device including a processor-implemented software development kit (SDK) engine configured to request and receive flight data from the one or more on-board avionics systems via the aircraft gateway;
    the on-aircraft mobile device further including the off-board applications that is configured to use the flight data to provide enhanced services and capabilities to flight crew members;
    the off-board application configured to select a set of avionics systems data, specify a duration of synchronization, and register with the SDK engine to receive the set of avionics system data for the duration of the synchronization, the SDK engine comprising a controller configured to:
receive a registration request from the off-board application, the registration request including a request to receive the set of avionics system data beginning at a beginning point and ending at an ending point;
register the off-board application to receive the set of avionics system data beginning at the beginning point and ending at the ending point during a flight;
set up triggering logic to identify the beginning point and the ending point for collecting the set of avionics system data during the flight;
systematically retrieve information for use by the triggering logic to identify the beginning point and the ending point;
when the beginning point is reached, systematically repeat:
retrieve the set of avionics system data; and
send, to the off-board application, data from the set of avionics system data that have changed state from prior data sent to the off-board application, wherein to send the data the controller is configured to compute data from the set of avionics system data and send the computed data to the off-board application; and
when the ending point is reached, cease sending data from the set of avionics system data to the off-board application.

2. The system of claim 1, wherein the SDK engine comprises an application registry for use by the off-board application to:
register for service;
select the set of avionics system data; and
specify the beginning point and the ending point.

3. The system of claim 2, wherein the SDK engine further comprises an event monitor configured to:
implement the triggering logic to identify the beginning point and the ending point;
determine which of the set of avionics system data was not previously sent to the off-board application or changed state since previously being sent to the off-board application; and
send to the off-board application data from the set of avionics system data-that was not previously sent to the off-board application or changed state since previously being sent to the off-board application.

4. The system of claim 3, wherein the SDK engine further comprises a data synchronization processor configured to:
systematically retrieve information for use by the triggering logic to identify the beginning point and the ending point; and
retrieve the set of avionics system data.

5. The system of claim 4, wherein the SDK engine further comprises a format processor configured to:
provide the data from the set of avionics system data to the off-board application in a format that the off-board application can understand.

6. A processor-implemented method in an aircraft for providing enhanced services during flight, the method comprising:
providing one or more on-board avionics systems in the aircraft including an on-board flight management system (FMS) that communicate via an internal cockpit network;
providing an aircraft gateway in the aircraft that is configured to provide flight data from the one or more on-board avionics systems to an off-board application residing on an off-board system on the aircraft without interrupting operation of the one or more on-board avionics systems;
wherein the off-board system comprises an on-aircraft mobile device, the on-aircraft mobile device comprising an electronic flight bag or a personal electronic device;
wherein the on-aircraft mobile device includes a processor-implemented software development kit (SDK) engine configured to request and receive flight data from the one or more on-board avionics systems via the aircraft gateway;
wherein the on-aircraft mobile device further includes the off-board application that is configured to use the flight data to provide enhanced services and capabilities to flight crew members;
selecting, by the off-board application, a set of avionics systems data;
specifying, by the off-board application, a beginning point and an ending point-for receiving the set of avionics system data;
registering, by the off-board application, with the SDK engine to receive the set of avionics system data beginning at the beginning point and ending at the ending point during a flight;
setting up triggering logic, by the SDK engine, to identify the beginning point and the ending point for collecting the set of avionics system data during the flight;
systematically retrieving, by the SDK engine, information for use by the triggering logic to identify the beginning point and the ending point;
when the beginning point is reached, systematically repeating, by the SDK engine:
retrieving the set of avionics systems data; and
sending, to the off-board application, data from the set of avionics system data that have changed state from prior data sent to the off-board application, wherein sending the data comprises computing data from the set of avionics system data and sending the computed data to the off-board application; and
when the ending point is reached, cease sending data from the set of avionics system data, by the SDK engine, to the off-board application.

7. The method of claim 6, further comprising:
receiving, by the SDK engine, a request from the off-board application to receive the set of avionics system data beginning at the beginning point and ending at the ending point; and
registering, by the SDK engine, the off-board application to receive the set of avionics system data beginning at the beginning point and ending at the ending point during the flight.

8. The method of claim 6, wherein sending the data from the set of avionics system data that have changed state from prior data sent to the off-board application comprises:
determining which of the data from the set of avionics system data was not previously sent to the off-board application or changed state since previously being sent to the off-board application; and
sending to the off-board application the data from the set of avionics system data that were not previously sent to the off-board application or changed state since previously being sent to the off-board application.

9. The method of claim 6, wherein systematically retrieving information for use by the triggering logic to identify the beginning point and the ending point comprises:

systematically retrieving information for use by the triggering logic from aircraft systems;
applying the retrieved information to the triggering logic; and
determining from applying the retrieved information to the triggering logic when the beginning point is reached.

10. The method of claim 6, wherein the set of avionics system data comprises flight data computed from the avionics system data.

11. The method of claim 10, further comprising:
receiving, by the SDK engine, a request from the off-board application to receive the flight data beginning at the beginning point and ending at the ending point; and
registering, by the SDK engine, the off-board application to receive the flight data beginning at the beginning point and ending at the ending point during the flight.

12. The method of claim 6, wherein:
the off-board application comprises a Weather Hazard Avoidance (WHA) application.

13. The method of claim 6, wherein:
the set of avionics system data comprises an active flight plan, an aircraft state, and an active leg;
the duration of the synchronization comprises a cruise flight phase; and
the triggering logic is configured to identify the cruise flight phase.

14. An aircraft, comprising:
one or more on-board avionics systems including an on-board flight management system (FMS) that communicate via an internal cockpit network;
an aircraft gateway that is configured to provide flight data from the one or more on-board avionics systems to an off-board application residing on an off-board system without interrupting operation of the one or more on-board avionics systems;
the off-board system comprising an on-aircraft mobile device, the on-aircraft mobile device comprising an electronic flight bag or a personal electronic device;
the on-aircraft mobile device including a processor-implemented software development kit (SDK) engine configured to request and receive flight data from the one or more on-board avionics systems via the aircraft gateway;
the on-aircraft mobile device further including the off-board application that is configured to use the flight data to provide enhanced services and capabilities to flight crew members;
the off-board application configured to select a set of avionics systems data, specify a duration of synchronization, and register with the SDK engine to receive the set of avionics system data for the duration of the synchronization,
the SDK engine comprising a controller configured to:
receive a registration request from the off-board application, the registration request including a request to receive the set of avionics system data beginning at a beginning point and ending at an ending point;
register the off-board application to receive the set of avionics system data beginning at the beginning point and ending at the ending point during a flight;
set up triggering logic to identify the beginning point and the ending point for collecting the set of avionics system data during the flight;
systematically retrieve information for use by the triggering logic to identify the beginning point and the ending point;
when the beginning point is reached, systematically repeat:
retrieve the set of avionics system data; and
send, to the off-board application, data from the set of avionics system data that have changed state from prior data sent to the off-board application, wherein to send the data the controller is configured to compute data from the set of avionics system data and send the computed data to the off-board application; and
when the ending point is reached, cease sending data from the set of avionics system data to the off-board application.

15. The aircraft of claim 14, wherein the SDK engine comprises an application registry for use by the off-board application to:
register for service;
select the set of avionics system data; and
specify the beginning point and the ending point.

16. The aircraft of claim 15, wherein the SDK engine further comprises an event monitor configured to:
implement the triggering logic to identify the beginning point and the ending point;
determine which of the set of avionics system data was not previously sent to the off-board application or changed state since previously being sent to the off-board application; and
send to the off-board application data from the set of avionics system data that was not previously sent to the off-board application or changed state since previously being sent to the off-board application.

17. The aircraft of claim 16, wherein the SDK engine further comprises a data synchronization processor configured to:
systematically retrieve information for use by the triggering logic to identify the beginning point and the ending point; and
retrieve the set of avionics system data.

18. The aircraft of claim 17, wherein the SDK engine further comprises a format processor configured to:
provide the data from the set of avionics system data to the off-board application in a format that the off-board application can understand.

19. The aircraft of claim 17, wherein:
the off-board application comprises a Weather Hazard Avoidance (WHA) application;
the set of avionics system data comprises an active flight plan, an aircraft state, and an active leg;
the duration of the synchronization comprises a cruise flight phase; and
the triggering logic is configured to identify the cruise flight phase.

20. The method of claim 6, wherein:
the off-board application comprises a Weather Hazard Avoidance (WHA) application;
registering, by the off-board application, with the SDK engine to receive the set of avionics system data beginning at the beginning point and ending at the ending point during a flight comprises registering for an active flight plan, aircraft state, active leg for a cruise flight phase; and
setting up triggering logic, by the SDK engine, to identify the beginning point and the ending point for collecting the set of avionics system data during the flight comprises setting up the triggering logic to identify the cruise flight phase.

* * * * *